Feb. 25, 1969   G. J. HARKAY   3,429,485
LIQUID MEASURING DISPENSER
Filed Sept. 26, 1967

INVENTOR.
GABRIEL J. HARKAY
BY
Richard L. Macniell

United States Patent Office 3,429,485
Patented Feb. 25, 1969

3,429,485
LIQUID MEASURING DISPENSER
Gabriel J. Harkay, San Diego, Calif., assignor to Cubic Corporation, San Diego, Calif., a corporation of California
Filed Sept. 26, 1967, Ser. No. 670,643
U.S. Cl. 222—442
Int. Cl. G01f *11/28*
5 Claims

ABSTRACT OF THE DISCLOSURE

A liquid measuring dispenser having first and second compartments therein, the first compartment being in communication through a check valve to a container and the second compartment being in direct communication with a pouring spout, the check valve being carried by one end of a rocker arm, the other end of which carries a check valve between the first and second compartments, the first compartment being filled during the pouring of liquid from the second compartment, and the second compartment being filled from the first compartment when the container is upright, and suitable air vent passages in communication with the first and second compartments.

Background of the invention

Figure 1:
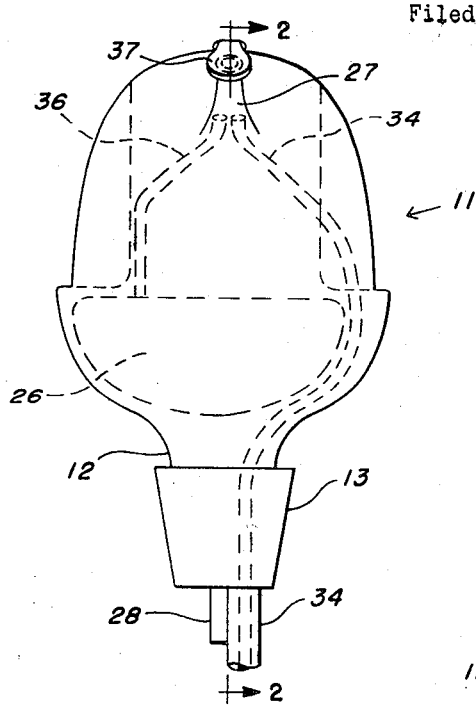

The present invention relates to a liquid measuring dispenser and more particularly to a liquid measuring dispenser which measures and dispenses the same amount of liquid on every tilting of an associated container.

According to the invention, a liquid measuring dispenser is provided having an upper compartment in communication with a container through a check valve. A lower compartment is in communication with the upper compartment through a check valve. The check valves are attached to each end of a rocker arm which pivots about a central point. A unique venting arrangement comprising an air channel in communication with the upper compartment and the container allows the displaced fluid in the upper compartment and the container to be replaced with air. The volume capacity of the upper and lower compartments automatically measures and delivers the same amount of liquid each time the container is tilted for pouring.

An object of the present invention is the provision of an improved liquid measuring dispenser which delivers the same amount of liquid on the tilting of an associated container.

An object of the invention is the adaptability of the liquid dispenser to a combination of dispensing and counting device, by providing suitable space for the addition of a counting instrument.

Another object of the invention is the provision of a liquid measuring dispenser which can be installed on a container in the same manner as a standard stopper.

A further object of the invention is the provision of a liquid measuring dispenser in which the liquid begins flowing as soon as its associated container is tilted.

Yet another object of the invention is the provision of a liquid measuring dispenser which is inexpensive to manufacture, has a minimum of moving parts, and is extremely durable.

Figure 2:
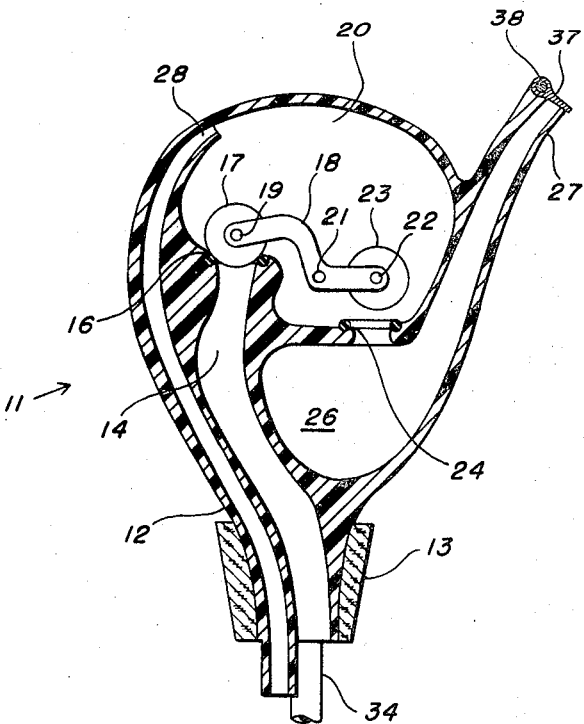

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 is a front elevation of the preferred embodiment of the present invention;
FIG. 2 is an elevation in cross-section of the embodiment of FIG. 1 taken along lines 2—2 of FIG. 1; and,
FIG. 3 is a top view partially of the embodiment of FIGS. 1 and 2.

Referring to FIG. 1, liquid measuring dispenser 11 has a neck 12 in cooperation with stopper 13 and vent lines 28 and 34 passing through stopper 13 in cooperation with spout 27. Vent line 36 couples lower chamber 26 with the outside, while vent 34 couples the liquid container (not shown) with the outside.

Referring to FIG. 2, the liquid measuring dispenser is again shown generally at 11 having neck 12 in communication with hollow stopper 13. Channel 14 of dispenser 11 is equipped with O-ring seal 16 which provides a seat for a heavy check valve 17. Check valve 17 is rotatably carried by rocker arm 18 at pin 19. Rocker arm 18 is rotatably carried by pin 21. Check valve 23 is dimensioned to seat on O-ring seal 24 which communicates with a lower chamber 26. Lower chamber 26 is in direct communication with a spout 27. Upper chamber 20 is in communication through vent passages 28 with the liquid container (not shown). Spout cover 37 is rotatably carried by pin 38, which is mounted on spout 27.

Figure 3:
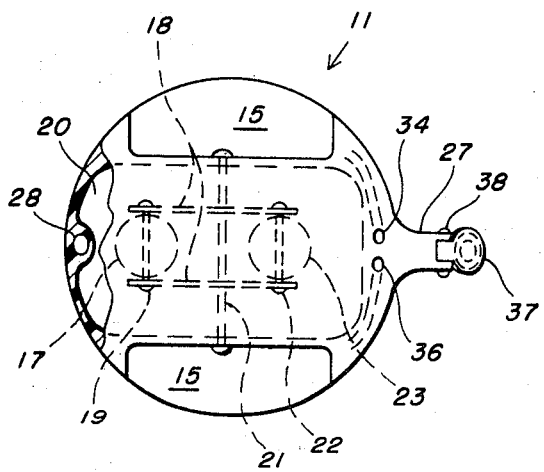

Referring to FIG. 3, liquid measuring dispenser 11 has spout 27 in the proximity of vent openings 34 and 36. Pin 21 is mounted through upper chamber 20 and rotatably carries rocker arm 18, one end of which carries pin 22 and the other end of which carries pin 19. Heavy check valve 17 is rotatably carried by pin 19 and light check valve 23 is rotatably carried by pin 22. Vent line 28 is in communication with upper chamber 20 and with the liquid container (not shown).

Operation

Assuming that stopper 13 is in communication with the neck of a container of liquid, the first time the container (not shown) with the liquid measuring dispenser 11 is tilted toward spout 27, heavy check valve 17 will open as rocker arm 18 pivots at pin 21, and the light check valve 23 will seat against O-ring 24. At this time, liquid will flow up through passage 14 filling upper chamber 20.

When the container is upright, heavy check valve 17 will cause rocker arm 18 to tilt back in the position shown allowing liquid to flow from upper chamber 20 to lower chamber 26 through the check valve 23. The next time the container is tilted, spout cover 37 opens by rotating about pin 38 and the fluid trapped in lower chamber 26 will pour through spout 27 and upper chamber 20 will refill as explained previously.

When the container is again placed upright, upper chamber 20 will drain into lower chamber 26 and the process repeated; lid 37 keeps the spout 27 covered.

It can be seen that the volume capacity of upper chamber 20 will determine the amount of liquid dispensed on each tilting of the container. If desired, a counter can be included in the apparatus in the space 15 to count the number of dispersions over a given period. This could be useful for experimental data as in the case of human behavioral research on liquid consumption, for example.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention.

What is claimed is:
1. A liquid measuring dispenser comprising:
a housing having upper and lower compartments there- in with a coupling aperture therebetween and a lower opening in said upper compartment;

a stopper adapted for cooperation with an opening in a container of liquid, said stopper having a first channel in communication with said lower opening in said upper compartment and a second channel in communication with an upper region of said upper compartment(s);

first and second valve means coupled to said lower opening and said aperture respectively, said first and second valve means operable for opening said lower opening and closing said aperture, respectively, in one position and for closing said lower opening and opening said aperture, respectively, in another position; and, a pouring spout coupled to said lower compartment.

2. The liquid measuring dispenser of claim 1 wherein: said first and second valve means are coupled to opposite ends of a rocker arm, said rocker arm being pivotally mounted within said upper compartment.

3. The liquid measuring dispenser of claim 2 wherein: said first and second valve means comprise first and second spheres rotatably coupled to opposite ends of said rocker arm.

4. The liquid measuring dispenser of claim 3 wherein: said lower opening in said upper compartment is oppositely disposed from said pouring spout.

5. The liquid measuring dispenser of claim 4 wherein: the sphere associated with said lower opening is heavier in weight than the sphere associated with said aperture.

References Cited

UNITED STATES PATENTS

| | | | |
|---|---|---|---|
| 2,165,565 | 7/1939 | McConnell | 222—442 |
| 2,728,490 | 12/1955 | Scannell et al. | 222—454 X |

STANLEY H. TOLLBERG, *Primary Examiner.*

U.S. Cl. X.R.

222—449